Figure 1:
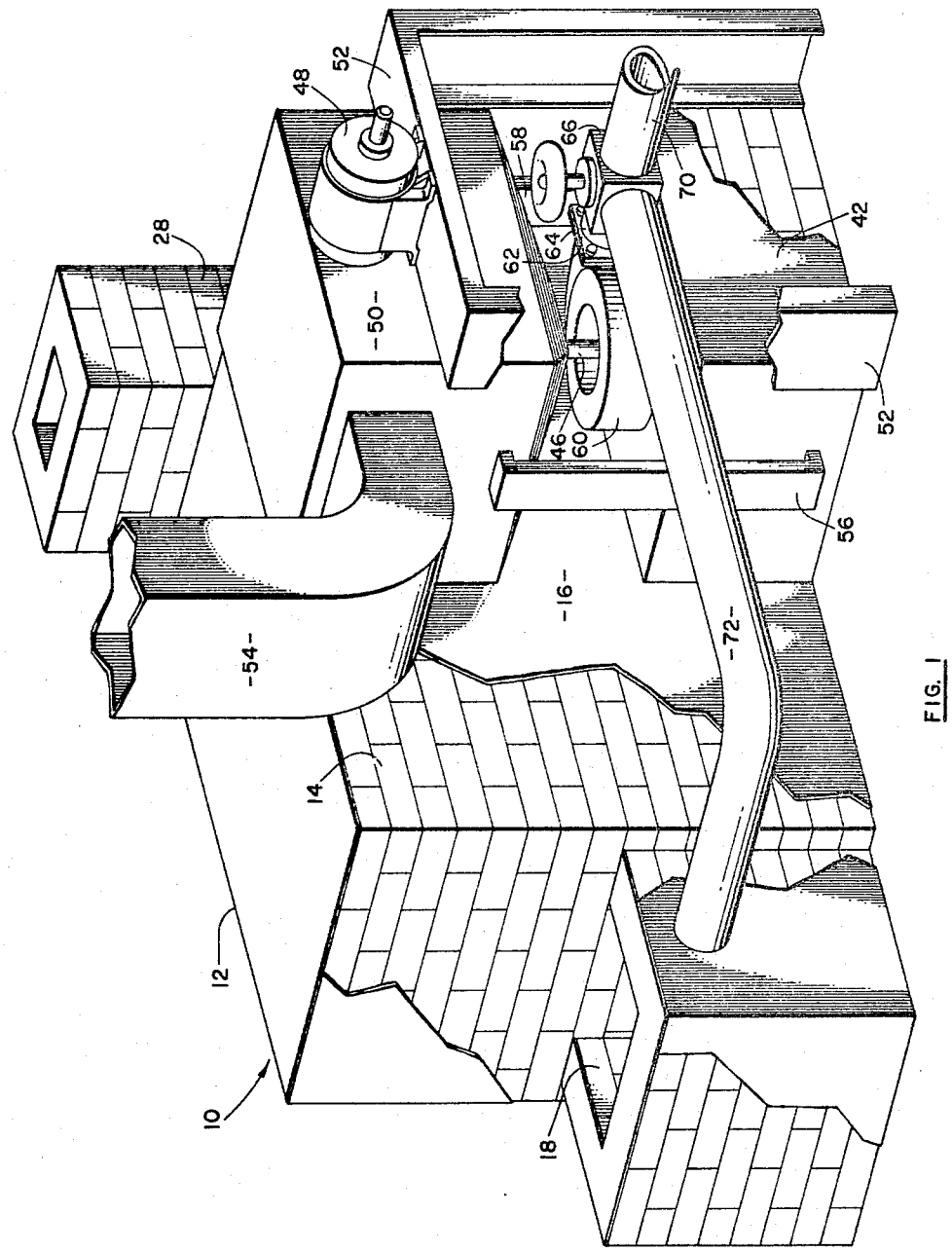

Oct. 4, 1966 R. S. BAKER ETAL 3,276,758
METAL MELTING FURNACE SYSTEM
Filed April 24, 1963 2 Sheets-Sheet 1

INVENTERS
RICHARD S. BAKER
MARTIN BURG
JOHN R. CHURCHILL
HENRY C. NETTE
BY
*Donald J. Ellingberg*
AGENT

INVENTERS
RICHARD S. BAKER
MARTIN BURG
JOHN R. CHURCHILL
HENRY C. NETTE

AGENT

3,276,758
METAL MELTING FURNACE SYSTEM
Richard S. Baker, Northridge, Martin Burg, Woodland Hills, John R. Churchill, Chatsworth, and Henry C. Nette, Woodland Hills, Calif., assignors to North American Aviation, Inc.
Filed Apr. 24, 1963, Ser. No. 275,280
2 Claims. (Cl. 266—33)

The present invention relates to a furnace system having an electromagnetic pump, and more particularly to a melting furance system having a helical rotor electromagnetic pump similar to the pump disclosed in U.S. Patent No. 2,940,393 to R. S. Baker, and assigned to the same assignee as the present invention.

Conventional fuel-fired and induction furnaces are used in modern foundry practice for melting solid metal which includes ingots, heavy scrap, and light scrap such as chips, borings, and the like, from in-plant machine operations. Scrap metal frequently provides more than 50 percent of the solid metal used in foundry operation.

Fine scrap metal has a high surface area-to-weight ratio which can result in an increased loss of metal due to oxidation during melting if the scrap is permitted to float on the melt surface. Therefore, if rapid oxidation is to be avoided, the scrap metal must be immersed rapidly into a bath of molten metal.

Rapid immersion in a bath of molten metal is also necessary for adequate preheating of the solid metal, particularly the scrap metal. Inadequate preheating increases the probability of undesirable dross formation in the melt and the incomplete removal of any surface films from the solid metal. The rapid immersion while desirable in reducing metal loss resulting from oxidation, dross formation, and the like, must be accomplished without an appreciable increase in melt turbulence. Any turbulence in the melt contributes to an increase in the formation of dross and gas absorption in the melt. Dross and included gas result in final castings which are of low quality.

Foundry melting practice has turned to separate melting furnaces for handling fine scrap metal to reduce the probability of increased dross formation and gas absorption in the final melt. The fine scrap is analyzed as a separate melt, the composition adjusted, pigged off, i.e. cast as a slab of metal, and the surface skimmed before the molten metal freezes. The reclaimed metal slab can then be returned along with ingots and heavy scrap to the main melting furnaces. This additional furnace for melting scrap, while desirable in reducing metal loss and in increasing the quality of the final castings, is an additional expenditure of time and money.

Metal loss is also experienced in known foundry practice which is desired to the production of metal alloys. Since alloy constituents have varying densities, an inhomogeneous melt results unless the melt is adequately stirred. Inhomogeneity in the alloy melt can contribute to a substantial metal loss. One foundry has experienced a metal loss of 2,000,000 pounds each month because of unacceptable alloy compositions, primarily because of inadequate stirring.

Foundry practice therefore requires a main furnace system for melting solid metal, which includes ingots, heavy scrap, and fine scrap, by rapidly immersing the scrap into the melt with a minimum of turbulence. It also requires a reliable furnace system which can maintain a homogeneous alloy melt with a minimum of system originated impurities and without an appreciable increase in melt turbulence. No melting furnace system known to those skilled in the art is capable of fulfilling these specialized requirements.

Accordingly, it is an object of the present invention to provide a new and improved melting furnace system.

It is also an object of the invention to provide a new and improved melting furnace system having a helical rotor electromagnetic pump.

Another object of the invention is to provide a new and improved melting furnace system having a pump induced liquid metal flow which is relatively clean and has a minimum of turbulence.

A further object of the invention is to provide a furnace system for the rapid immersion and melting of solid metal.

Likewise an object of the invention is to provide a melting furnace system that substantially reduces metal burn-up.

Yet another object of the invention is to provide a furnace system that minimizes dross formation and gas absorption during melting.

It is also an object of the invention to provide a melting furnace system that facilitates stirring a melt to maintain homogeneity thereof.

Figure 2:
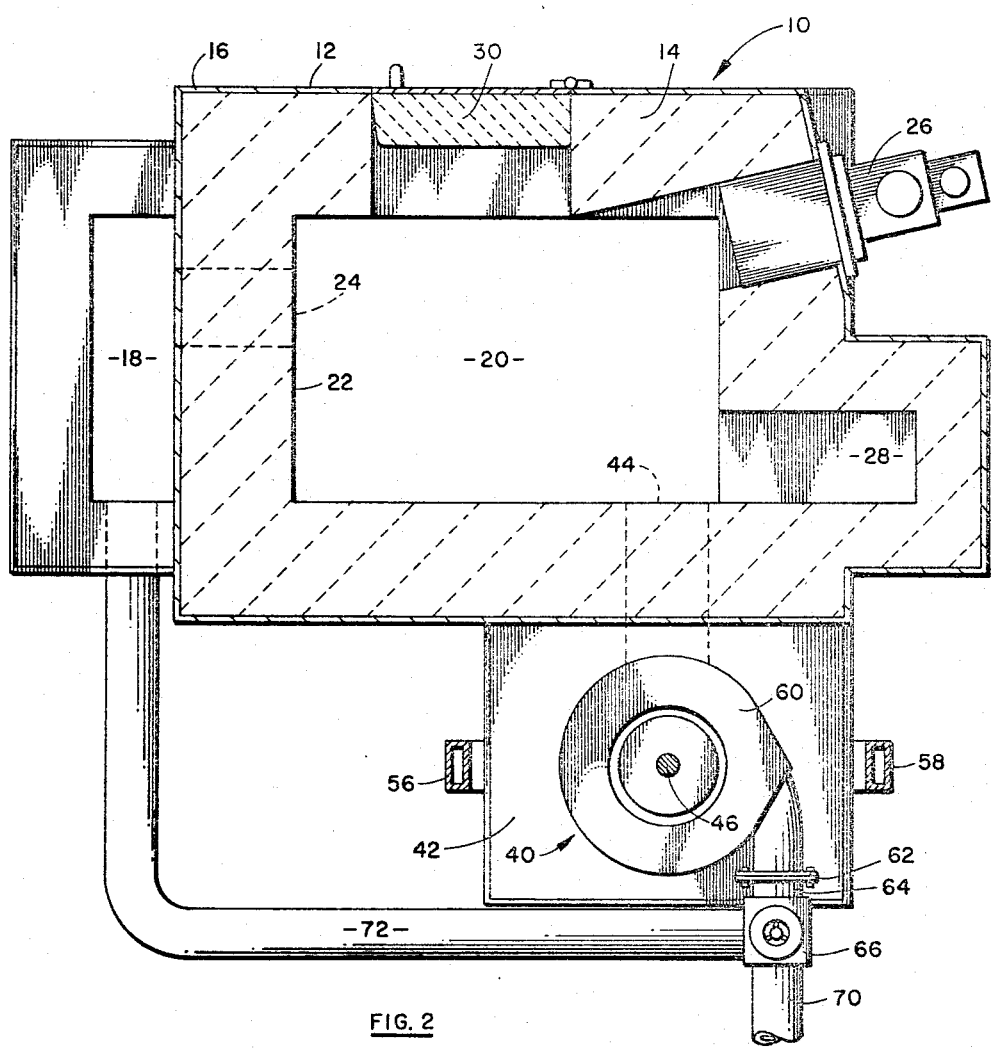

Further objects, features, and the attending advantages of the invention will become apparent with regard to the following description read in conjunction with the accompanying drawings, in which:

FIGURE 1 is a perspective view, partly broken away, of the new and improved melting furnace system of the invention; and FIGURE 2 is a sectionalized plan view of the melting furnace system of FIGURE 1.

Briefly, in accordance with the invention, a melting furnace is provided with a helical rotor electromagnetic pump for pumping clean liquid metal in a substantially laminar and directionalized flow from the holding well of the furnace selectively to the furnace charging well or to other locations where work is to be done with or to the liquid metal.

Referring to FIGURES 1 and 2, the melting furnace system 10 of the invention is shown in one specific embodiment. The melting furnace 12 of the system is preferably formed in a well-known manner from a suitable refractory material, such as refractory brick 14. The built-up arrangement of refractory brick 14 may be sheathed with metal plate 16 or the like. A charging well 18 of the furnace 12 is separated from a refractory basin or melting chamber 20 by wall 22 of the melting furnace. One or more ports, such as port 24 shown in phantom by FIGURE 2, provides fluid communication between the charging well 18 and the melting chamber 20.

A fuel-fired burner 26, shown by FIGURE 2, is positioned in the melting chamber 20 to direct the products of combustion above and generally parallel with the surface of a bath of molten metal, not shown, that is contained in the melting chamber. The combustion gases preferably exhaust from the melting chamber 20 through a suitable exhaust stack 28. While a fuel-fired burner has been shown, it is contemplated that other heat sources can also be used. A separate loading door 30 may be provided to the melting chamber 20 although this is not critical for the operability of the present melting furnace system 10.

A helical rotor electromagnetic pump 40 similar to that disclosed in Patent No. 2,940,393 is positioned in a holding or ladling well 42 of the melting furnace 12. The pump 40 may be removably positioned in the well or built in the well 42 as shown. When the pump 40 is built in the well 42, it is contemplated that the well structure may be formed to develop certain of the pump flow passages where such is preferred. For example, the well wall may form the outer wall of the pump region or annulus, and may house the pump field structure. Both the ladling well 42 and an inlet, not shown, of the helical rotor pump 40 are maintained in fluid communication with the melting chamber 20 through one or more suitable ports, such as port 44 shown in phantom by FIGURE 2. Port 44 is preferably positioned below the normal operating level of the molten bath contained in chamber 20.

The rotor shaft 46 of the helical rotor pump 40 is driven by a prime mover, such as electric motor 48, through a suitable power transmission, not shown, within plenum chamber 50. A beam arrangement 52 supports the electric motor 48 and the related plenum chamber 50 when the pump 40 is built in the well 42 as shown. An air intake 54 is connected to the plenum chamber 50, and cooling ducts 56 and 58 direct cooling air from the plenum chamber to the components of the helical rotor pump 40 as may be required.

The discharge scroll or outlet 60 of the helical rotor pump 40 is connected at joint 62 to a discharge conduit 64. A suitable valve means 66 is connected between discharge conduit 64 and one or more conduit branches, such as conduits 70 and 72. Conduit branch 70 provides, for example, a closed flow passage for transporting clean liquid metal to another location where work is to be done with or to the liquid metal. It is contemplated that the valve means 66 may be omitted in certain uses of the present melting furnace system. It is also contemplated that conduit branches to other locations, such as conduit 70, may be omitted where closed-loop pumping through conduit 72 is desired in the melting furnace system. Conduit branch 72 preferably taps through one wall of the charging well 18 and completes the closed flow passage for liquid metal from the holding well 42 to the charging well 18 of the melting furnace 12.

Operatively, when the helical rotor electromagnetic pump 40 is actuated, clean liquid metal passes from the melting chamber 20 through port 44 to the pump positioned in ladling well 40. The clean liquid metal discharges from scroll 60 into the discharge conduit 64 in a laminar, directionalized flow. The discharge flow from the helical rotor pump 40 is sufficiently large to enable transfer of liquid metal at a substantially constant temperature. For example, one helical rotor pump similar to pump 40 has a normal flow rate of 2,630 gallons per minute at a developed pressure of 31.5 p.s.i.

The discharge flow passes from discharge conduit 64 selectively into any one or combination of branch conduits, such as conduits 70 and 72. Closed branch conduits 70 and 72 enable the controlled transfer of the clean liquid metal from the melting furnace without exposure to the surrounding atmosphere, thereby reducing dross formation and gas absorption in the liquid metal. Because of the high flow rate characteristics of the helical rotor pump and the closed branch conduits, the liquid metal can be transferred at a near constant temperature with a minimum of system originated impurities. This is particularly desirable in the transfer of high temperature liquid metals, such as aluminum, nickel, zinc, brass, and the like.

The stream of clean liquid metal which discharges from conduit 72 at a high flow rate into charging well 18 rapidly immerses solid metal, particularly fine scrap metal, introduced therein. The high flow rate of liquid metal issuing from conduit 72 immerses the solid metal to rapidly preheat the metal by conduction and convection. Rapid immersion and preheating substantially reduce metal burn-up or oxidation during melting and permit the reduction of solid metal, including fine scrap metal, in a main melting furnace. In addition, although the discharge flow from conduit 72 is at a high rate, the flow is substantially calm, laminar, and directionalized which further reduces dross formation and gas absorption in the melt. Since the helical rotor pump 40 has no moving parts in the relatively unobstructed pump region, erosion of the flow passages is minimized providing extended system operation with a minimum of system originated impurities.

When closd-loop pumping is desired, the calm flow of clean metal from the ladling well 42 to charging well 18 at a substantially constant temperature increases the homogeneity of the liquid metal in the melting furnace system without a substantial increase in dross accumulation or gas absorption. If a completely closed melting furnace system is desired, the charging well 18 and related portions of the system may be sealed and a controlled atmosphere introduced above the melt surface.

As will be evidenced from the foregoing description, certain aspects of the invention are not limited to the particular details of construction as illustrated. The melting furnace system of the invention may be applied to other known forms of melting furnaces having melting or holding chambers from which liquid metal can be pumped. It is contemplated that modifications and other applications will occur to those skilled in the art, and it is therefore intended that the appended claims shall cover such modifications and applications that do not depart from the true spirit and scope of the invention.

Having described the invention, what is claimed is:

1. A melting furnace system having a charging well in fluid communication with liquid metal in a melting chamber and comprising:
    (a) at least one helical rotor electromagnetic pump,
    (b) at least one pump inlet from the melting chamber to said pump means,
    (c) at least one discharge conduit from said pump means, and
    (d) a plurality of branch conduits connected to said discharge conduit,
    (e) at least one of said branch conduits in fluid communication with the charging well to direct the liquid metal from the melting chamber to the charging well under pump induced pressure.

2. A melting furnace system having a charging well in fluid communication with liquid metal in a melting chamber and comprising:
    (a) at least one helical rotor electromagnetic pump,
    (b) at least one pump inlet from the melting chamber to said pump means,
    (c) at least one discharge conduit from said pump means,
    (d) suitable valve means in said discharge conduit, and
    (e) a plurality of branch conduits connected to said valve means,
    (f) at least one of said branch conduits in fluid communication with the charging well to direct the liquid metal from the melting chamber to the charging well under pump induced pressure.

References Cited by the Examiner

UNITED STATES PATENTS

| | | | |
|---|---|---|---|
| 303,205 | 8/1884 | Bennett | 266—13 |
| 2,462,661 | 2/1949 | Munday | 266—13 |
| 2,940,393 | 6/1960 | Baker | 103—1 |
| 2,987,391 | 6/1961 | Foster et al. | 266—33 |
| 3,185,463 | 5/1965 | Daubersy | 266—13 |

JOHN F. CAMPBELL, *Primary Examiner.*

M. L. FAIGUS, *Assistant Examiner.*